United States Patent

Pope et al.

[11] Patent Number: 5,188,375
[45] Date of Patent: Feb. 23, 1993

[54] SQUEEZE FILM DAMPER PISTON RING SEAL

[75] Inventors: Adam N. Pope; Melvin Bobo, both of Cincinnati, Ohio

[73] Assignee: General Electric Company, Cincinnati, Ohio

[21] Appl. No.: 657,034

[22] Filed: Feb. 19, 1991

[51] Int. Cl.$^5$ .............................. F16J 15/16
[52] U.S. Cl. ........................ 277/58; 277/27; 277/79; 277/168; 277/214; 384/99
[58] Field of Search .............. 277/58, 27, 168, 29, 277/201, 173, 202, 174, 214, 216, 215, 78, 79, 70, 71; 384/99

[56] References Cited

U.S. PATENT DOCUMENTS

| | | | |
|---|---|---|---|
| 1,334,393 | 3/1920 | Parsons et al. | 277/201 X |
| 1,538,525 | 5/1925 | Teetor | 277/168 X |
| 1,558,515 | 10/1925 | Teetor | 277/78 |
| 1,579,043 | 3/1926 | Wester | 277/215 X |
| 1,710,485 | 4/1929 | McKont | 277/168 |
| 1,723,432 | 8/1929 | Morton | 277/79 X |
| 1,743,578 | 1/1930 | Solenberger | 277/78 |
| 1,782,426 | 11/1930 | Johnson | 277/78 |
| 1,853,937 | 4/1932 | Solenberger | 277/70 X |
| 1,856,271 | 5/1932 | Solenberger | 277/78 |
| 1,988,726 | 1/1935 | Godron | 277/27 |
| 1,996,147 | 4/1935 | Cromis | 277/79 |
| 2,001,119 | 5/1935 | Bedwell | 277/201 |
| 2,037,984 | 4/1936 | Johnson | 277/201 |
| 2,048,258 | 7/1936 | Godron | 277/168 X |
| 2,927,831 | 3/1960 | Tuczek | 277/168 |
| 2,970,023 | 1/1961 | Thompson | 277/215 X |
| 3,195,903 | 7/1965 | Hesling | 277/201 X |
| 3,743,303 | 7/1973 | Pope | 277/173 X |
| 3,862,480 | 1/1975 | Packard et al. | 277/216 X |
| 3,915,459 | 10/1975 | Kunderman | 277/27 |
| 4,214,796 | 7/1980 | Monzel et al. | |
| 4,289,264 | 9/1981 | Rawlins | 277/27 |
| 4,337,983 | 7/1982 | Hibner | |
| 5,048,978 | 9/1991 | Singh | 384/99 |
| 5,071,262 | 12/1991 | Monzel et al. | 384/99 |

OTHER PUBLICATIONS

"Experimental Measurement of the Dynamic Force Response of a Squeeze-Film Bearing Damper," Vance & Kirton, *Transactions of the ASME*, Nov. 1975, p. 1283.

Primary Examiner—William A. Cuchlinski, Jr.
Assistant Examiner—Daniel G. DePumpo
Attorney, Agent, or Firm—Jerome C. Squillaro; John R. Rafter

[57] ABSTRACT

A piston ring seal for squeeze film dampers includes radial fluid vent passages through the ring section leading from the outer circumferential face of the ring through the inner circumference of the ring to the ring groove. A combination step ring and step groove prevents incorrect assembly.

8 Claims, 2 Drawing Sheets

SQUEEZE FILM DAMPER PISTON RING SEAL

BACKGROUND OF THE INVENTION

This invention relates to an improved piston ring seal in squeeze film shaft dampers for rotating machinery such as hot gas turbine engines, and more particularly to an improved piston ring seal having radial and axial pressure force compensating characteristics to maintain sealing under varying pressure conditions.

A squeeze film damper generally includes a thin annular space between a moveable bearing support and its housing. Oil under pressure is introduced into the annular space to limit support motion. Piston ring type seals are employed at each side of the annular space to provide fluid sealing. Ordinarily those piston ring seals depend on certain circumferentially distributed pressure forces for effective sealing. However, fluid pressures employed for ring sealing in a squeeze film damper are not distributed equally circumferentially and their variation may cause unseating of the ring seals with resulting excessive fluid leakage. Furthermore, since piston ring seals are easily reversed during assembly, judicious caution must be exercised in providing any modifications in the ring structure which, if the ring is improperly installed may cause rapid failure of the damper.

OBJECTS OF THE INVENTION

It is an object of this invention to provide an improved piston ring seal for squeeze film dampers.

It is another object of this invention to provide improved pressure distribution on piston ring seals in squeeze film dampers.

It is a further object of this invention to provide a piston ring seal configuration which prevents erroneous assembly of piston ring seals of this invention.

SUMMARY OF THE INVENTION

A piston ring seal utilizes strategically located fluid apertures in the ring structure to vent higher pressure fluid regions to those of lower fluid pressures to retain ring seating under changing pressure conditions tending to unseat the ring. A particular ring structure prevents inadvertent and improper assembly of the ring.

This invention will be better understood when taken in connection with the following drawings and description of preferred embodiments.

BRIEF DESCRIPTION OF PREFERRED EMBODIMENTS

Figure 1:
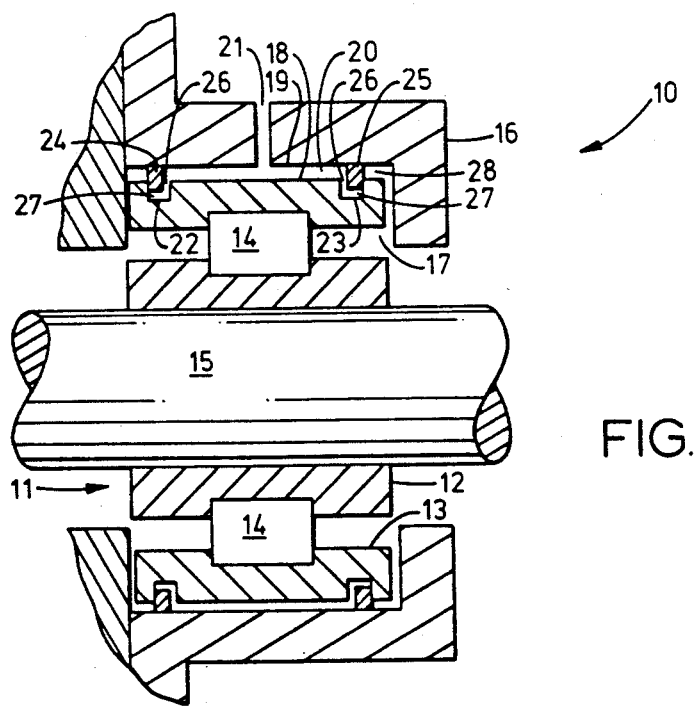
FIG. 1 is a partial cross-sectional illustration of one kind of squeeze film damper to which this invention relates.

Referring now to FIG. 1, a squeeze film damper assembly 10 is combined with a rolling element bearing assembly 11. Bearing assembly 11 comprises an inner race 12 and a spaced outer annular race 13 with rolling elements 14 therebetween. Inner race 12 is fitted on a shaft 15 such as a turbine rotor shaft of a hot gas turbine engine for rotation on rolling elements 14 in bearing assembly 11. A supporting housing 16 for bearing assembly 11 includes an annular chamber 17 therein, and outer annular race 13 is fitted or positioned in chamber 17 to have limited radial motion therein. The outer circumferential surface 18 of annular race 13 is closely adjacent the inner circumferential surface 19 of annular chamber 17 to define an annular thin squeeze film space 20. A damper fluid such as an oil is introduced into space 20 through an inlet conduit 21 from an appropriate source of damper fluid under pressure (not shown). During operation of the damper assembly, a shaft-rotor imbalance may cause shaft 15 and rolling element bearing 11 to undergo radial motion and subject damper fluid in space 20 to very high pressure. In order to seal damper fluid in annular space 20, annular outer race 13 includes a pair of oppositely spaced apart piston ring grooves 22 and 23 concentrically in its outer surface 18 adjacent its sides, and a pair of piston ring seals 24 and 25 are fitted in these grooves to engage circumferential surface 19 of chamber 17 in radial sealing relationship. Damper fluid, usually an oil, under pressure in space 20 is employed to assist in piston ring sealing. For example, in FIG. 1 each ring is shown with a side space 26 between the ring and the inner sidewall of its retaining groove. Side space 26 is in open fluid flow communication with high pressure damper fluid in space 20. Accordingly, damper fluid pressure in space 20 is exerted against an inner sidewall of each ring 24 and 25 to force the ring into firmer engagement with its opposite groove sidewall for more effective fluid sealing between the contiguous ring and groove surfaces. Also, as illustrated in FIG. 1, rings 24 and 25 are somewhat elevated in their grooves to define a further space 27 under each ring 24 and 25, referred to as a gland space. Gland spaces 27 also communicate in fluid flow relationship with damper fluid under pressure in space 20 through intermediate side space 26. Accordingly damper fluid pressure is transmitted to space 27 to bear against rings 24 and 25 to urge them into firmer sealing engagement with circumferential surface 19 of chamber 17. Better sealing by rings 24 and 25 is achieved when the damper fluid pressures generated in space 20 and gland 27 are better distributed circumferentially on rings 24 and 25. However, during operation of the described damper assemblies particularly as associated with hot gas turbine engines, shaft 15 may be caused to have a limited orbital motion due to a shaft-rotor imbalance. The eccentric rotating motion is transmitted to outer race 13 for similar motion in chamber 17, and the eccentric motion of race 13 in chamber 17 produces a very high pressure in space 20 in approximately one half the circumference of annular space 20 where eccentric motion of race 13 reduces spare 20 to a minimum, and a relatively low or cavitating pressure in the remaining approximately one half circumference where eccentric motion provides a maximum thickness of space 20. This variation in circumferential pressure leads to poor sealing of rings 24 and 25 with resultant excess loss of damper fluid and decreased damper effectiveness. For example, as illustrated in FIG. 1, where pressure in gland space 27 is denoted Pg, effective radial sealing of a ring against surface 19 is greatly assisted by having Pg at least equal to pressure P1 in squeeze film space 20. However, as described, the circumferential distribution of pressures in film space 20 is not equal and accordingly not equal in gland space 27. The variation in circumferential distribution of pressure in squeeze film space 20 and, correspondingly in side space 26 and gland space 27 can produce the occasion where the squeeze film pressure P1 in squeeze film space 20 is less than the pressure P3 in the damper sump space 28 on the opposite side of a ring from squeeze film space 20 so that pressure P3 becomes greater than the pressure Pg in gland space 27. Under these albeit transient conditions, a ring such as ring 25 may unseat radially and permit deleterious air leakage into space 20 from sump space 28 which leads to a damper oil collection sump at ambient conditions.

A further problem occurs when, because of unequal circumferential pressure distribution, pressure P1 in squeeze film space 20 becomes from about 20% to about 40% higher than the pressure Pg in gland space 27, and causes radial unseating of the rings with excess leakage of damper fluid.

Both above noted problems relate to radial sealing of the rings under unequal pressure distribution conditions, and pressure balancing rings of this invention may be utilized to reinforce radial sealing of the rings. A pressure balancing ring of this invention is illustrated in FIG. 2.

Figure 2:
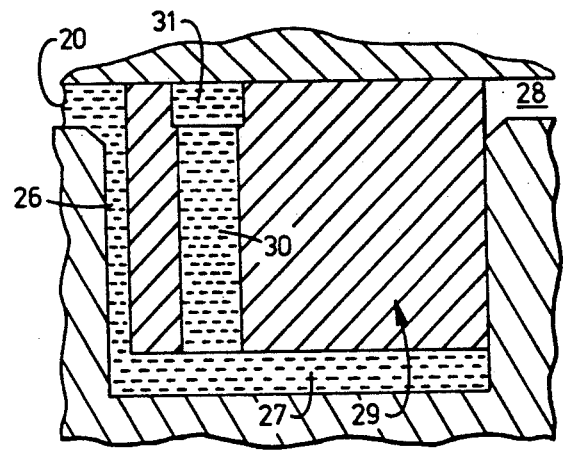
FIG. 2 is an enlarged schematic and cross-sectional view of an improved piston ring seal of this invention.

Referring to FIG. 2, pressure balancing ring 29 is shown in cross-section to have a radial fluid vent passage 30 leading from the outer circumferential surface or face of the ring and passing through the ring cross-section. Ring 29 includes a pair of axially opposite, spaced apart sidewalls. When ring 29 is positioned in its groove such as groove 22 or 23 of FIG. 1, in a squeeze film damper, vent passage 30 opens into gland space 27. Vent passage 30 represents one of a plurality of such passages spaced circumferentially about ring 29. The row of passages 30 are interconnected in fluid flow relationship at the ring sealing face by an annular channel or groove 31. It is preferable that the row of passages 30 be next adjacent the squeeze film 20 side of the ring. Pressure profiles of operating conditions where Pg=P1, and P1>P3 (where P3 is the oil sump pressure outboard of the ring in space 28, i.e. on the opposite side from a space 20) indicate that net radial pressure forces are imposed on ring 29 in the direction to seal the ring radially. Vent passages 30, by connecting gland space 27 to the annular groove 31, maintain pressure in groove 31 at a level near equal to pressure in gland space 27. It is noted with respect to FIGS. 1 and 2 that a pair of spaced apart rings such as ring 29 may be interchanged one for the other or reversed, and if interchanged or reversed, serious operational difficulties would occur. However, the pressure balance ring of the present invention is readily adaptable to a configuration which is neither interchangeable nor reversible. For example, ring 29 of this invention may be formed with a stepped configuration in combination with a stepped groove so that only a correct orientation of a ring with its groove will permit assembly. A stepped ring and groove combination is illustrated in FIG. 3.

Figure 3:
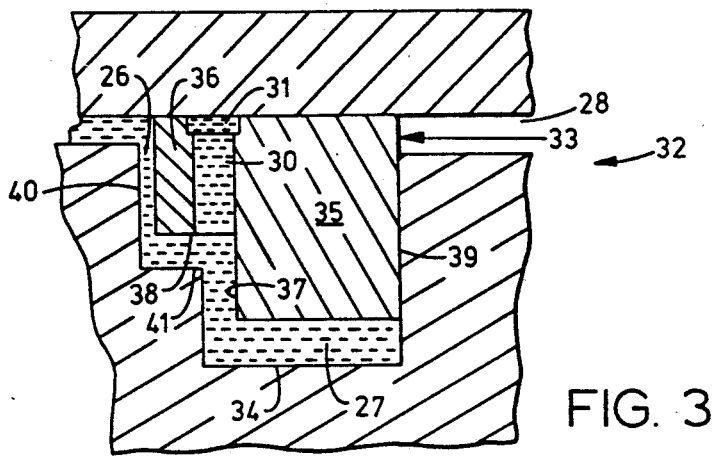
FIG. 3 is a schematic cross-sectional illustration of a unidirectional modification of the ring of FIG. 2.

Referring now to FIG. 3, a ring and groove assembly 32 comprises a unidirectional ring 33 of this invention residing in its unidirectional groove 34. A ring 33 may be described in cross-section as having a generally rectangular configuration including a pair of axially opposite, spaced apart sidewalls with a reverse step or notch between the squeeze film space 20 side of the ring and its inner circumferential surface. More specifically and as illustrated in FIG. 3, ring 33 includes a generally rectangular main section 35 having an appended rectangular section 36 projecting from a side surface 37 thereof in overhang relationship. Vent passages 30, as described with respect to FIG. 2, project radially through overhang section 36 next adjacent side surface 37 of main section 35. The projection of overhang section 36 from main section 35 defines the reverse step or notch configuration 38. In cross-section as illustrated in FIG. 3, groove 34 may be described as having opposite and spaced apart sidewalls with a step therein between the squeeze film space 20 side of the groove and the bottom of the groove. More particularly, groove 34 includes a generally rectangular main section 39 with an open adjacent upper side chamber 40. Upper side chamber 40 defines a step configuration 41 at the bottom of groove 34. Step configuration 41 is complementary to the reverse step or notch 38 of ring 33, and, when ring 33 is fitted in groove 34, notch or reverse step 38 interfits in spaced relationship with step 41. As illustrated and described, the step rings of this invention are unidirectional in that they will only correctly assemble when they are oriented in the proper and only direction for seating in their groove in a manner to preserve a side space 26 and gland space 27. Passages 30 with their interconnecting annular groove 31 open directly into gland space 27 so that pressure Pg in gland space 27 is rapidly communicated to annular groove 31. Proper assembly of the step rings of this invention locates passages 30 and groove 31 to be next adjacent squeeze film space 20. An improved sealing modification of rings 29 and 33 of FIGS. 2 and 3 respectively, is illustrated in cross-section in FIG. 4.

Figure 4:
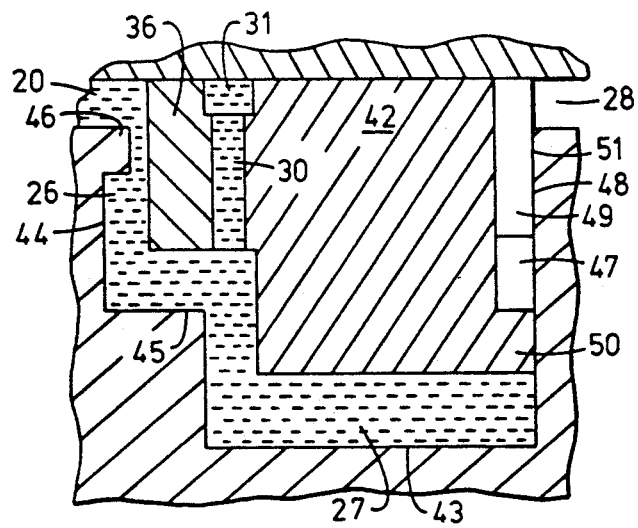
FIG. 4 is a cross-sectional view of a pressure venting or balancing modification of the ring of FIG. 3.

Referring now to FIG. 4, a step ring 42 resides in operative relationship in its step groove 43. The wall of groove 43 which defines upper side chamber 44 and step 45 includes a fluid flow projection or restrictor 46 extending inwardly into vent space 26 to be closely spaced to overhang section 36. Restrictor 46 provides a throttling action to fluid flow between gland space 27 and squeeze film space 20. As a result, when cavitation takes place in squeeze film space 20, and pressure Pg in gland space 27 becomes greater than pressure P1 in squeeze film space 20, flow restriction action of restrictor 46 retains a more elevated pressure in gland 27 for longer term radial sealing of ring 42.

To satisfy the fundamental requirement of continuity of flow, the fluid flowing from the high pressure side of the squeeze film 20 through restrictor 46 and into gland space 27 in the 180° arc where squeeze film pressure is relatively high, must flow out of the gland space 27 through the restrictor 46, of flow area equal to the inflow area, in the 180° arc on the low pressure or cavitating side of the squeeze film. Provided that the radial clearance in the groove 27 is larger than the squeeze film 20 radial clearance so that restriction to fluid flow in the circumferential direction in the groove is substantially less than in the squeeze film, the circumferential pressure distribution in the groove will be relatively uniform and approximately equal to the average of squeeze film high pressure side pressure and squeeze film cavitating side pressure. In most practical applications, this average pressure is usually substantially greater than the squeeze film cavitating side pressure. Using this fact, in concert with the discrete distribution of this uniformly higher groove pressure by appropriate geometric considerations, provides the hydraulic force means by which the ring will stay in sealing contact on both its transverse and arcuate interfaces when either the squeeze film 20 minimum pressure is lower than the pressure in space 28 or higher than the pressure in the groove 27.

In some instances, pressure in space 28, opposite a ring and squeeze film space 20, and through which damper oil from leakage past the sealing rings passes to a collection sump, may be greater than pressure in squeeze film space 20. Such a condition may cause the adjacent ring to unseat and permit air from space 28 to enter squeeze film space 20 With deleterious damper results. The pressure balancing rings of this invention are effective in maintaining Pg at a higher pressure to minimize loss of radial sealing engagement of the sealing rings under the described conditions. Ring engagement axially is assisted by a further pressure distribution system in ring groove interface wall 48 which is a single uninterrupted planar wall extending from the outer sealing face of ring 42 to its inner circumferential surface, i.e., without step or step-like changes of direction. The noted system comprises a circumferential and coaxial groove 47 in wall 48 of ring 42. Projecting radially from circumferential groove 47 is a circumferentially spaced array of radial vent passages 49 (only one shown) leading radially from the circumference of groove 47 to space 28 and interconnecting groove 47 and space 28 in open fluid flow relationship. Circumferential groove 47 divides wall 48 into an inner annular region 50, which rests in sealing engagement with adjacent wall of groove 43, and outer annular region 51 which incorporates radial vents 49 with intermediate regions of vents 49 also engaging the adjacent wall of groove 43. All grooves in the system are in coplanar relationship.

The further pressure distribution system as described assists in sustaining axial engagement of a ring with a groove wall. Step ring seals of this invention, those of FIGS. 3 and 4, for example, are shown in operative relationship, in a damper assembly similar to assembly 10 of FIG. 1, in FIG. 5.

Figure 5:
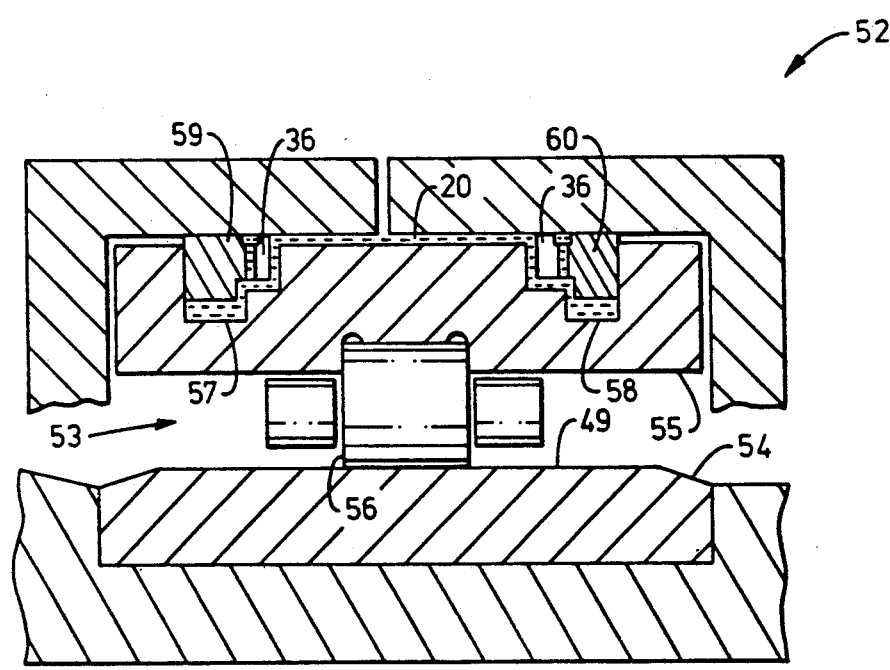
FIG. 5 is a cross-sectional illustration of a squeeze film damper utilizing the unidirectional pressure compensating rings of this invention.

Referring now to FIG. 5, damper assembly 52 includes a rolling element bearing assembly 53 with inner and outer races 54 and 55 and rolling elements 56 therebetween. Outer race 55, in this embodiment includes a pair of spaced apart piston ring seal grooves 57 and 58 which are step grooves as illustrated in FIGS. 3 and 4. Unidirectional piston ring seals 59 and 60 are positioned in grooves 57 and 58. The step ring grooves 57 and 58 dictate that step rings 59 and 60 be assembled in the only one correct direction. The overhang sections 36 of the step rings project towards each other and are next adjacent squeeze film space 20. Operating features and characteristics of rings 59 and 60 and grooves 57 and 58 are similar to their counterparts discussed with respect to FIGS. 2-4.

While this invention has been disclosed and described with respect to preferred embodiments, it will be understood by those skilled in the art that various changes and modifications may be made without departing from the spirit and scope of the invention in the following claims.

What is claimed:

1. In a squeeze film damper employing spaced apart annular piston ring seals to seal an annular squeeze film space therebetween with a damper sump space oppositely thereby, the improvement of a combined step ring and step groove therefore comprising in combination
    (a) said damper including spaced apart annular grooves therein,
    (b) said grooves having axially opposite sidewalls and a cross-section with a step therein adjacent one sidewall at the bottom of the groove,
    (c) and a step ring in each said grooves,
    (d) said step rings having a radially outer circumferential sealing face surface and an inner circumferential surface with axially opposite sidewalls and a reverse step cross-section between the squeeze film space side wall of the ring and the inner circumferential surface of the ring to define a main section and an appended overhang section with a ring groove interface wall axially opposite said overhang section,
    (e) said overhang section including a radial fluid flow passage therein extending through said outer sealing surface and said overhang section,
    (f) said ring groove interface wall comprising a planar surface extending from the sealing face of said ring to said inner circumferential surface thereof,
    (g) said rings being received in said grooves such that
        (i) the squeeze film space side wall of said ring is separated from said groove by a fluid filled step side space, and
        (ii) said inner circumferential surface of said ring is separated from said groove by a fluid filled bottom gland space, and
    (h) wherein said ring groove interface wall includes a circular flow groove concentrically therein, said circular flow groove dividing said interface wall into an inner annular region in sealing engagement with the adjacent groove wall, and an outer annular region, said outer annular region incorporating therein a circumferentially spaced array of radial fluid flow grooves radially extending from and through said circular flow groove through said radially outer circumferential sealing surface thereby interconnecting said circular flow groove with said sump space in open fluid flow relationship, wherein said radial fluid flow grooves and said circular flow groove assist in axially seating said interface wall of said ring against the adjacent groove wall.

2. The invention as recited in claim 1 wherein said radial fluid flow passage is one of a circumferential row of such passages projecting through said overhang section next adjacent said main section.

3. The invention as recited in claim 1 wherein said ring overhang sections overhang towards each other.

4. The invention a s recited in claim 1 wherein said overhang section includes a circumferential groove therein interconnecting said radial passages in fluid flow relationship.

5. The invention as recited in claim 1 wherein aid circular groove and said radial grooves are in coplanar relationship.

6. The invention as recited in claim 1, wherein a first one of said groove sidewalls is proximate the annular squeeze film space and includes a fluid flow restrictor, wherein said restirctor extends axially into said fluid filled step side space, said restrictor being axially separated from said overhang section.

7. The invention as recited in claim 6, wherein said restrictor provides a throttling action to a fluid flow between said fluid filled bottom gland space and the squeeze film space.

8. The invention as recited in claim 7, wherein said fluid filled bottom gland space includes a radial height which is larger than a radial thickness of the squeeze film space thereby causing a fluid pressure in said gland space to be approximately equal to an average of a high pressure side pressure in the squeeze film space and a cavitating side pressure in the squeeze film space.

* * * * *